Figures 1, 2:
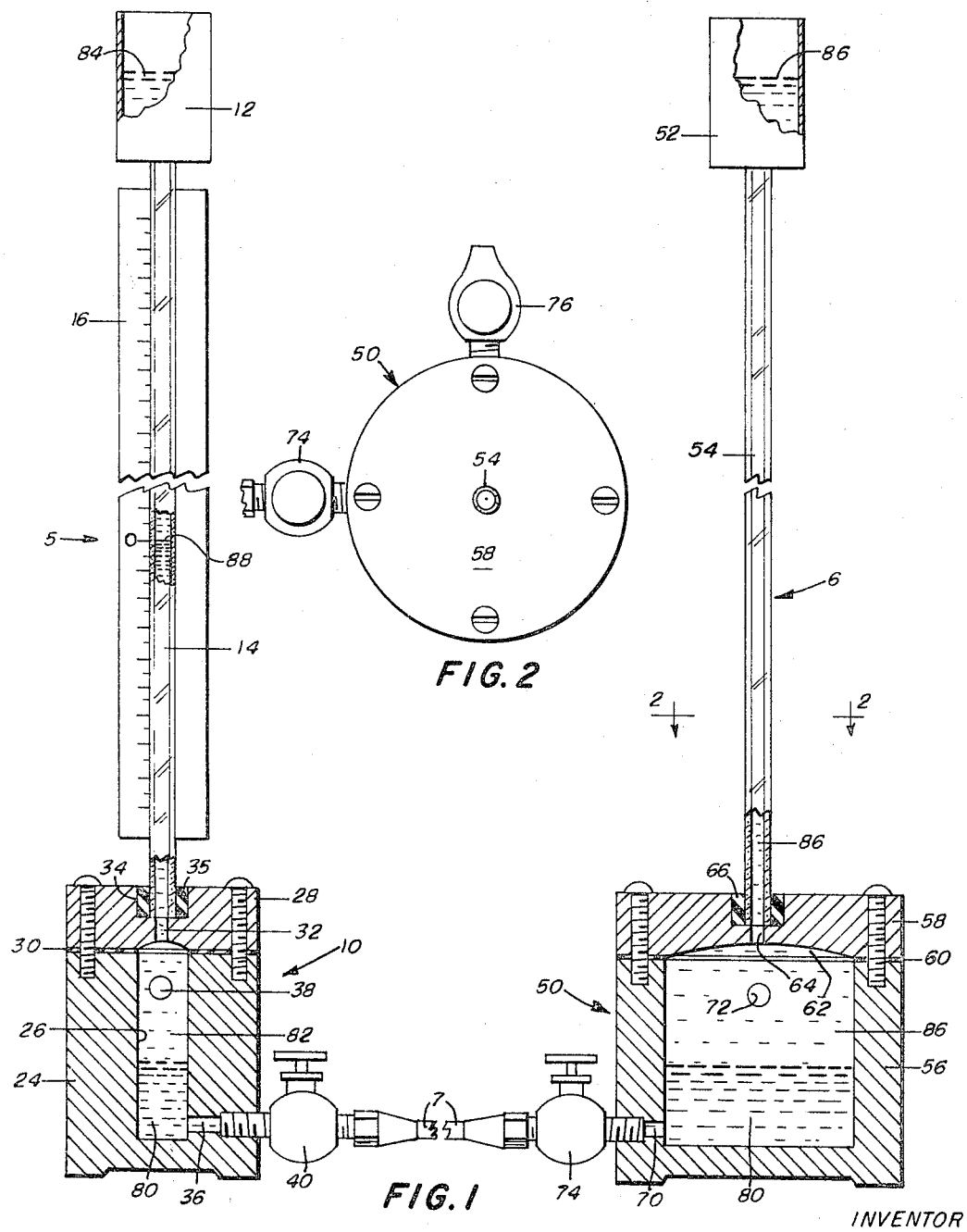

March 28, 1967  A. W. WATTS  3,310,880
GRAVITY TYPE HYDRAULIC AMPLIFIER PRECISE LEVEL
Filed Oct. 29, 1964

INVENTOR
Ernest S. Cohen
BY
Gersten Sadowsky
ATTORNEYS

3,310,880
GRAVITY TYPE HYDRAULIC AMPLIFIER PRECISE LEVEL
Abner W. Watts, 7231 W. Bayaud Ave., Denver, Colo. 80226
Filed Oct. 29, 1964, Ser. No. 407,597
6 Claims. (Cl. 33—209)

The invention herein described and claimed may be manufactured and used by or for the Government of the United States of America for governmental purposes without the payment of royalties thereon or therefor.

The invention relates to an apparatus for determining height relationships between different level surfaces. More particularly, the apparatus is operable to obtain accurate measurements of relative surface elevations by applying the principles of hydraulics to greatly amplify indications of small displacements. Further, the invention facilitates a precise determination of differences in elevation between surfaces of a plurality of widely separated areas.

A principal object of the invention is to provide an apparatus for precisely measuring relative elevation between surfaces.

Another object of the invention is to provide an apparatus having means to amplify liquid displacements indicative of very small differences in elevation to obtain corresponding larger, easily observable indications.

These and other objects of the invention will be more clearly understood from the following description of a preferred embodiment of the invention, considered together with the accompanying drawing wherein:

FIG. 1 is an elevational view, partly in cross-section, of the principal parts of an apparatus according to the invention; and FIG. 2 is a partial cross sectional view of the apparatus shown in FIG. 1, along line 2—2.

Constituting the physical arrangement of the invention as illustrated in FIG. 1 are two columnar structures 5 and 6 which are cooperatively interrelated through their respective connections to an elongated flexible tube 7. Columnar structure 5 includes a housing 10, and a reservoir receptacle 12, interconnected by a straight, rigid, small bore, transparent tubing 14 of glass, plastic, or like material, vertically disposed between the housing and receptacle. Attached to tubing 14, so as to extend along side nearly the full length thereof, is a scale card 16. The calibrated scale on card 16 is arranged to show marks corresponding to thousandths of an inch displacement extending vertically above and below a central zero index point.

Defined within the relatively thick wall of a cylindrical block 24, constituting the larger part of housing 10, is a well 26 extending axially down through almost the full height of the block and opening flush with a smooth, flat surface constituting the top side of the block. A considerably shorter cylindrical block 28, providing a cover for block 24, is set in place thereon over a collar-like gasket 30, conforming to the facing surfaces of the blocks. Blocks 24 and 28 are clamped tightly together, to effect a seal with gasket 30, by means of a plurality of conventional machine screws which pass through spaced openings in block 28, and are fastened in threaded holes through the top of block 24. An axial hole 32 constitutes a conduit through cover block 28 providing a passage between a counterbore 34 in the top of the block, and a concavity on the underside thereof aligned over the opening to well 26 in block 24, whereby the passage is completed into the well from outside of housing 10. The lower end of tubing 14 is received in counterbore 34, and sealed therein by a gasket 35 press fitted between the tubing and inner surface of the counterbore. The upper end of tubing 14 is joined to the bottom of receptacle 12 by means of a similar press fitted connection including a sealing gasket.

A passage 36, extending radially through the wall of block 24 adjacent to the bottom closure wall thereof, communicates the lower part of well 26 with a threaded opening at the outer end of the passage. Opening into the upper end of well 26 is a further radial passage 38, also extending through the wall of block 24, and terminating in a threaded opening. In each of these threaded openings is securely screwed a nipple extending from one side of a manually operable valve, of which only the lower valve 40 is shown in FIG. 1. Also provided is a conventional compression coupling which attaches one end of flexible tube 7 to a nipple extended from the other side of valve 40 to effect one of the connections operatively relating columnar structures 5 and 6.

Like the assembly hereinbefore described, columnar structure 6 comprises a housing 50 and a reservoir receptacle 52 which are operatively interconnected by a straight, rigid, transparent tubing 54. In this instance, however, the bore of the connective tubing 54 is significantly larger than that of tubing 14 of columnar structure 5, and the size of housing 50 is at least half again larger than that of housing 10. Correspondingly, a well 62 within the confines of housing 50 is a number of times larger than the well of housing 10. Otherwise the form of housing 50 is similar to that of its counterpart in that it includes a base block 56 covered by a shorter block 58 and a gasket 60, which are securely fastened together by a plurality of machine screws. A hole 64, axially disposed in cover block 58, constitutes a conduit between a counterbore 66 and a concavity in the top and bottom surfaces of the block, respectively. Appropriate gaskets set into counterbore 66 and the underside of receptacle 52, function in an obvious manner to seal the extremities of tubing 54 at their junctures with the housing and receptacle.

Holes 70 and 72, radially extending through the wall of block 56 and opening into well 62 thereof adjacent to the well's lower and upper ends, respectively, have suitably threaded portions wherein are secured manually operable valves 74 and 76. Referring to FIG. 2, these valves are shown entering block 56 at right angles to each other in an arrangement which is also applicable to the construction for block 24 of housing 10. The further connection between the columnar structures by way of flexible tube 7 is accomplished by means of a conventional compression coupling joining the tube to a nipple of valve 74. It is therefore evident from the form of the various parts, previously described, and their assemblage, that the two reservoir receptacles 12 and 52 can be caused to directly communicate through the bores in tubings 14 and 54, the passages axially disposed in cover blocks 28 and 58, the cup-like interiors of wells 26 and 62, valves 40 and 72, and the flexible tube 7.

To operatively condition the assemblage described, its columnar structures 5 and 6 are placed such that housings 10 and 50 are set up side by side on a level surface, and wells 26 and 62 together with tube 7 are supplied with mercury 80 to a level which fills approximately one-half the volumes of wells 26 and 62. After closing valve 40, a relatively low specific gravity liquid 82, having a low viscosity index and normally immiscible with mercury, is forced through the valve in passage 38 to fill the remainder of well 26, and completely fill the tubing 14 up to the base of reservoir 12. Liquid 82 is preferably colored red so that it may be easily identified and distinguished. Another liquid 84 with a specific gravity lower than liquid 82, that has a low viscosity index and generally immiscible with liquid 82, but easily separable therefrom if these liquids should come together, is added to fill approximately one-half of reservoir 12. Liquid 84 is preferably clear in color. A further liquid 86 that has a low viscosity index and normally immiscible with mercury is then forced through valve 76 to fill the remainder of well 62, tubing 54 and approximately one-half of reservoir 52. Liquid 86 may be the same as liquid 82 or liquid 84, or some other similar liquid. All passages are thereafter allowed to communicate with each other by the opening of valve 40. The valve in passage 38 is then opened slightly and momentarily to allow a small amount of liquid 82 to escape whereby the line of demarcation 88 between liquids 82 and 84 is caused to reach a point one-half the distance between the top of block 28 and the underside of reservoir 12.

Operation of the apparatus according to the invention is based on the natural laws that a liquid will seek its own level, and a displaced liquid remains unchanged in volume. Therefore, it is evident that any vertical displacement of columnar structure 5 relative to columnar structure 6, changes the levels of mercury in wells 26 and 62 in respect to the bases of their housings. Since raising columnar structure 5 causes the level of mercury 80 in well 26 to depress and the mercury level in well 62 to rise, liquids 82 and 84 supported on mercury 80 in well 26, move down and liquid 86, supported on the mercury in well 62, moves up to follow the mercury levels in the respective wells. In the event columnar structure 5 is lowered relative to columnar structure 6, it is obvious that the displacements of the liquids and the relative positions eventually reached by their levels will be reversed. An essentially balanced hydraulic head is maintained in the columnar structures 5 and 6 by reason of the relative large inside diameters of the reservoir receptacles 12 and 52, which serve to minimize the change in hydraulic head that occurs because of the differences in heights of the mercury columns defined by wells 26 and 62 obtained when the columnar structures are relatively displaced up or down.

Because during vertical displacement of columnar structure 5, for example upwardly, liquid 82 flows from the relatively thin tube 14 into well 26 to fill the void left by the receding mercury, the drop in liquid level defined by the mercury is amplified for positioning demarcation line 88, in proportion to the ratio between the diameters of well 26 and the passage in tube 14. Further amplification of the displacement given line 88 is obtained as a result of the difference in the diameters of wells 26 and 62. In seeking its own level mercury from elevated well 26 flows toward well 62 to raise the mercury level therein. However, since the diameter of well 62 is a number of times greater than that of well 26, a substantially increased volume of mercury from well 26 is required before a common level is reached in the two wells. Consequently, the change in height of mercury in well 26 can be made to closely approach the actual change in elevation being measured by an appropriate selection of the ratio of diameters of wells 26 and 62. Superimposed amplifications can therefore be advantageously applied to enlarge the displacement of demarcation line 88 to provide distinguishable readings on scale 16 to indicate very small differences in surface elevations. By utilizing the present invention differences in elevation of a plurality of points on a machined surface, or surfaces of a large piece of equipment, can be determined with a precision in the range to the nearest $1/1000$ of an inch or greater.

Deflection of line of demarcation 88 to a magnitude required for a specified type of measurement can be provided by a careful selection of proper dimensions for the apparatus based on the aforementioned operating principles. Accordingly, scale card 16 can be calibrated, marked and attached to tubing 14 such that the movement of line 88 indicates any predetermined differences in elevation between the bases of housing 10 and 50, as well as the direction of these differences up or down. To provide an adjustment to reset the zero index on scale card 16 in respect to line 88, provisions, not shown, can be made to either adjust the card 16 up or down on the tubing 14, or insert a movable slug in housing 10 or 50 to change the displacement of the mercury therein to bring line 88 to the zero mark on the scale. While a preferred embodiment of the invention has been illustrated and described, it is understood that the invention is not limited thereby, but is susceptible to change in form and detail.

What is claimed is:

1. A liquid level system comprising a pair of vertically disposed columnar structures having fluid flow passages extending longitudinally thereof, each said columnar structure including an elongated conduit having a flow passage of substantially uniform cross sectional area, one of said conduits containing in the lower part thereof a first liquid having a relatively low specific gravity and in the upper part thereof a second liquid slightly lighter than and immiscible with said first liquid, the line of contact between said liquids serving as an indicator line, the other of said conduits being filled with said first liquid, at least said conduit containing two liquids being transparent, each said columnar structure also including a vessel attached to the lower end of said conduit, each said vessel having one of said conduit passages opening into it, each said vessel also having a flow passage of substantially uniform cross sectional area substantially larger than the cross sectional area of the conduit passage which opens into it, each said vessel further having its upper portion filled with said first liquid and its lower portion filled with a third liquid having a relatively high specific gravity and being immiscible with said first liquid, a further fluid flow passage connecting the said lower portions of said vessels, the flow passage in one of said vessels having a cross sectional area substantially larger than the flow passage in the other of said vessels, each columnar structure also including container means attached to the upper end of said conduit with said conduit flow passage opening into said container, each said container having an internal cross sectional area substantially larger than the cross sectional area of the conduit passage opening into it, the container attached to said conduit containing two liquids being partially filled with said second liquid, and the container attached to said other conduit being partially filled with said first liquid.

2. The liquid level system of claim 1 wherein said line of contact is approximately half way between the ends of said conduit containing two liquids.

3. The liquid level system of claim 1 wherein the flow passage of each said vessel of said pair of columnar structures is cylindrical, and the axial lengths of said vessel flow passages are vertically disposed and equal.

4. The liquid level system of claim 1 wherein each said vessel of said columnar structures comprises first and second parts constituting a lower vessel and a cover therefor, respectively, first and second valve means connected to each said first part, said first valve means being used in supplying said first and second liquids to said system, and said second valve means used to control the flow of said third liquid in said further fluid flow passage connecting said vessels.

5. The liquid level system of claim 1 wherein said further flow passage comprises an extended length of flexible tubing.

6. The liquid level system of claim 2 including a vertically disposed, elongated scale means having an index point centered thereon and calibrations of distance extending up and down therefrom, and means attaching said scale means to said conduit containing two liquids, such that said line of contact between said liquids is initially aligned over said index point on said scale means.

(References on following page)

References Cited by the Examiner

UNITED STATES PATENTS

| | | | |
|---|---|---|---|
| 397,695 | 2/1889 | Clough et al. | 33—209 |
| 631,976 | 8/1899 | Whittemore | 33—209 |
| 1,216,129 | 2/1917 | Jenning | 33—209 |
| 2,142,124 | 1/1939 | Gardner | 33—209 |
| 2,362,325 | 11/1944 | Thurmond | 33—209 |

FOREIGN PATENTS

| | | |
|---|---|---|
| 225,021 | 1958 | Australia. |
| 3,523 | 2/1895 | Great Britain. |
| 6,280 | 1887 | Great Britain. |

LEONARD FORMAN, *Primary Examiner.*

L. V. ANDERSON, *Assistant Examiner.*